Jan. 26, 1932.  W. A. CHRYST  1,842,821
SHOCK ABSORBER
Filed Oct. 6, 1928
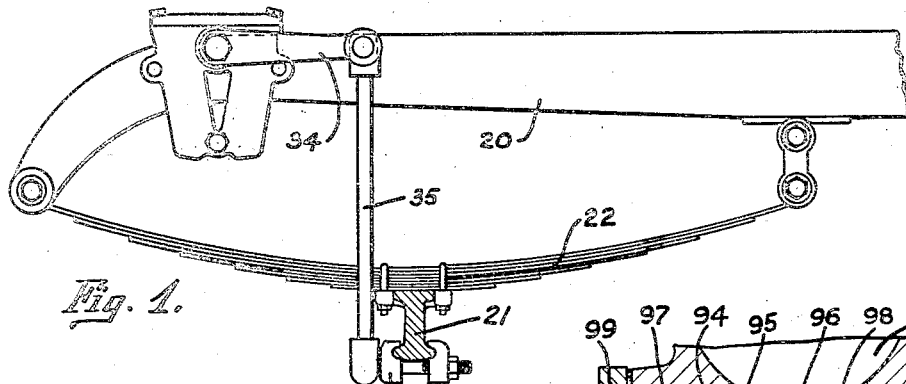
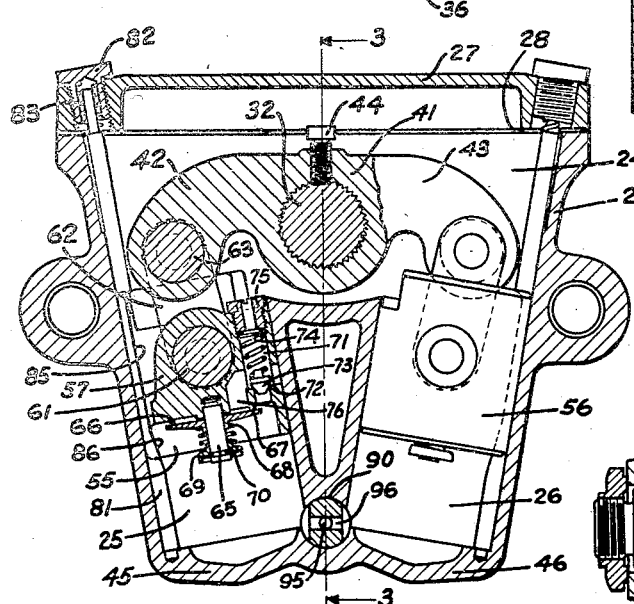
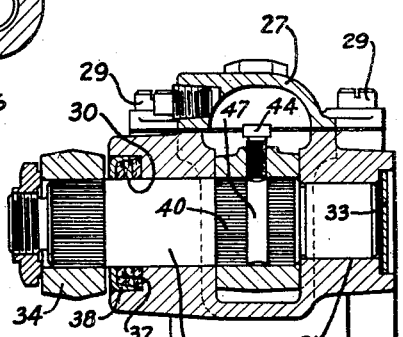
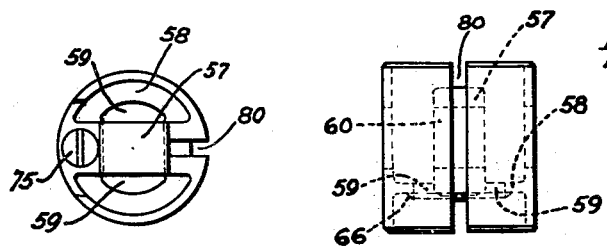
Inventor
William A. Chryst
By Spencer, Hardman and Feld
Attorney Patented Jan. 26, 1932

1,842,821

UNITED STATES PATENT OFFICE

WILLIAM A. CHRYST, OF DAYTON, OHIO, ASSIGNOR, BY MESNE ASSIGNMENTS, TO DELCO PRODUCTS CORPORATION, OF DAYTON, OHIO, A CORPORATION OF DELAWARE

SHOCK ABSORBER

Application filed October 6, 1928. Serial No. 310,861.

This invention relates to improvements in shock absorbers for cushioning the movement of two relatively movable members, for example, a frame and axle of a vehicle.

It is among the objects of the present invention to provide a shock absorber of simple and compact construction for resisting both the approaching and separating movements of the frame and axle of a vehicle and thus dissipating road shocks and preventing their transmission to the vehicle frame.

Further objects and advantages of the present invention will be apparent from the following description, reference being had to the accompanying drawings, wherein a preferred embodiment of one form of the present invention is clearly shown.

In the drawings:

Fig. 1 illustrates a front portion of the frame of an automotive vehicle supported by springs upon the usual axle, the shock absorber embodying the present invention is shown applied thereto.

Fig. 2 is a cross sectional view taken longitudinally through the shock absorber.

Fig. 3 is a cross sectional view taken along the line 3—3 of Fig. 2.

Fig. 4 is a fragmentary sectional view on an enlarged scale, taken along the line 4—4 of Fig. 3.

Fig. 5 is a plan view of one of the pistons of the shock absorber; and

Fig. 6 is a side elevational view of the piston shown in Fig. 5.

Referring to the drawings, and particularly to the Fig. 1, the reference numeral 20 indicates the vehicle frame supported on the axle 21 by springs 22, only one of which is shown. Axle 21 has the usual road wheels, not shown, attached thereto.

The shock absorber comprises a casing 23 presenting a fluid chamber 24 and a pair of cylinders 25 and 26, said cylinders having end walls 45 and 46 respectively, said cylinders being so arranged that their axes converge. A cover plate 27 provided with a gasket 28 is attached to the casing 23 by screws 29, seals the fluid chamber 24. Casing 23 has two oppositely disposed lug portions presenting the aligned bearings 30 and 31 in which the rocker shaft 32 is journalled. Bearing portion 31 is sealed against fluid leaks by a plug-disc 33. The shaft 32 extends through bearing portion 30 to the outside of casing 23, this outside end of the shaft 32 having one end of the shock absorber operating arm 34 securely attached thereto so that the said arm 34 and shaft 32 will rotate together. The other end of arm 34 is swivelly attached to one end of a connecting rod 35, the other end of this rod being swivelly secured to a bracket member 36 anchored to the axle 21. In a recess provided in the lug portion presenting bearing 30 there are provided packing rings 37, which are forced into gripping engagement with shaft 32 by a packing gland 38 which fits tightly into the aforementioned recess. This provides a substantially leak-proof packing about the shaft 32 at the bearing 30.

A portion of the shaft 32 extending across the fluid chamber 24 is knurled as at 40. On this knurled portion of shaft 32 there is rigidly secured a lever 41 having oppositely disposed arms 42 and 43. Arm 42 aligns with the cylinder 25, and arm 43 with cylinder 26. A set screw 44 in lever 41 engages an annular groove 47 in the knurled portion of shaft 32 and prevents endwise movement of the lever 41 on shaft 32.

Cylinders 25 and 26 are provided with fluid displacement members or pistons 55 and 56 respectively. Piston 55 is connected with lever arm 42 and piston 56 is attached to lever arm 43. Inasmuch as both pistons 55 and 56 are constructed alike, only one will be described detailedly for the sake of brevity.

Referring to the piston 55, which is termed the "bumper" piston hereinafter, the numeral 57 indicates a central lug formed within the cylindrical wall of the piston and attached thereto by a web 58 which has an aperture 59 on each side of the lug 57, see Figs. 5 and 6. A transverse opening 60 in lug 57 receives a pin 61, to the ends of which are attached ends of a pair of links 62, the other ends of said links being attached to a cross pin 63 carried by the lever arm 42.

The means for establishing a free flow of fluid from the fluid chamber 24 into the cylinder 25 in response to the movement of the piston 55 in one direction, that is, in the direction away from the end wall 45 of said cylinder 55, comprises a valve pin 65 rigidly supported by the piston lug 57 so that said pin is substantially coaxial of the piston and between apertures 59. An annular ledge 66 is provided on the web 58 so as to completely surround the apertures 59. A valve 67, slidably supported upon the valve pin 65 is yieldably maintained against the annular ledge 66 by a spring 68, whereby the apertures 59 are held normally closed. The spring 68 surrounds pin 65 and is interposed between valve 67 and an abutment member 69 secured on the pin 65 adjacent its end by a C washer 70.

The lug 57 of piston 55 has a passage 71, one end of which is of reduced size presenting a valve seat 72. Upon this valve seat 72, valve 73 is yieldably maintained by a spring 74 which is interposed between valve 73 and a hollow nut 75 screw-threaded into one end of passage 71. Between the valve 73 and the nut 75 passage 71 is connected with apertures 59 by a cross-passage 76.

In the outer surface of the cylindrical wall of piston 55 there is provided a longitudinal groove 80. Within the cylinder 25, and longitudinally thereof, there is provided a metering pin 81 the lower end of which is embedded in an aperture provided in the end wall 45 of cylinder 25. The metering pin 81 fits slidably into the groove 80 of the piston. A recessed screw 82 is provided in the cover 27, said screw having a spring 83 which engages a shoulder portion on the upper end of the metering pin 81 and thus yieldably maintains said pin in proper position in the cylinder 25 so that the piston 55 may slide over the pin 81 as it is reciprocated in its cylinder 25. The metering pin 81 has a recess 85 in the side facing the piston 55, the one end surface of said recess sloping toward the piston as at 86. This sloping surface 86 is so positioned in the pin 81 that it will be adjacent the lower end of the groove 80 of piston 55 when said piston is in the normal position as shown in Fig. 2. In this position the said sloping surface 86 and the piston groove 80 present an orifice of a predetermined size which orifice is gradually decreased as the piston moves over the pin 81 approaching the highest point of said sloping surface 86.

The means for establishing a restricted flow of fluid from one cylinder to the other in response to the movement of either one or the other of the pistons toward the closed ends of their respective cylinders comprises a fluid flow controlling device contained within a transverse recess 90 provided in the casing adjacent the converging ends of the cylinders 25 and 26. One end of this recess is closed as at 91, the other end is open and outside of the shock absorber casing. Both cylinders 25 and 26 are in communication with the recess 90.

Within the recess 90 is provided a valve plug 92 having an eccentric lug 93 projecting from its inner end and into a recess in the closed end 91 which prevents rotation of the plug in the recess 90. A ring disc 94 is screw-threaded into the open end of recess 90 and engages the plug 92 to maintain it in proper position in the recess 90. Plug 92 has an axial bore 95 extending from its outer end throughout a portion of its length. A cross passage or duct 96 connects with the axial bore 95 and provides communication between cylinders 25 and 26 through the valve plug 92. A manually adjustable metering pin 97 is screw-threaded into the bore 95, said pin having a tapering end 98 adjacent the duct 96. The position of the tapering end 98 relative to the duct 96 regulates the fluid flow capacity of said duct. The end of the metering pin 97 extends toward the open end of recess 90 and is accessible from outside the shock absorber for manual adjustment. A cover cap-screw 99 is provided in the open end of recess 90, said screw 99 having a gasket to prevent fluid leaks at this point.

The shock absorber operates as follows:
When the wheels of the vehicle strike an obstruction in the roadway, springs 22 will be flexed toward the frame 20, causing the connecting rod 35 to move arm 34 to rotate the shaft 32 in a counter-clockwise direction. Such movement of shaft 32 will move the lever 41 so that its arm 42 forces the piston 55 downwardly into the cylinder 25, or more specifically toward the closed end 45 thereof. At the same time piston 56 will be moved away from the end 46 of its cylinder 26 by the lever arm 43. Fluid within the cylinder 25 will have pressure exerted thereon by the movement of piston 55 downwardly, causing a restricted flow of fluid through the orifice provided by the sloping surface 86 of the metering pin 81 and the groove 80 of the piston. This orifice will gradually be decreased as the piston 55 moves from the normal position as shown in Fig. 2 toward the bottom end of the cylinder 25, thus, as such orifice is reduced, the restriction to the flow of fluid therethrough is gradually increased and consequently the piston will offer resistance to the counter-clockwise movement of the lever 41, and thus the upward movement of spring 22, gradually increasingly. If, in any case, the pressure upon the fluid within cylinder 25 exceeds a predetermined value, valve 73 will be moved from the valve seat 72 against the effect of spring 74, thus establishing an additional flow of fluid from the cylinder 25 to the fluid chamber 24. Downward movement of piston 55 will also force fluid from the cylinder 25 through the duct 96 into the cylinder 26, said fluid flow being controlled by the position of the tapered end 98 of metering pin 95 relative to said cross passage or duct 96.

Upward movement of the piston 56 will cause the fluid in the fluid chamber 24 to force the valve in this piston, corresponding to the valve 67 of piston 55, from its seat and thus establish a free flow of fluid from the fluid chamber through its passages, corresponding to passages, 59 of piston 55, into the cylinder 26.

As soon as the spring 22 has reached its limit of flexure caused by striking the obstruction, it will tend to return to its normal position with a rebounding movement, such rebounding movement ordinarily causing jars and shocks to be transmitted to the body of the vehicle supported on the frame 20. Upon the return movement of spring 22 toward its normal position, the connecting rod 35 will operate the shock absorber arm 34, which in turn will rotate the shaft 32 clockwise, thus causing its lever 41 to move the piston 56 downwardly into its cylinder 26. Fluid pressure is now exerted upon the fluid within cylinder 26, which resists the movement of the piston downwardly. Movement of the piston 56 downwardly causes a fluid flow through the duct 96 into the cylinder 25 and another fluid flow through the orifice presented between the metering pin of piston 56 and said piston, said metering pin being provided with a sloping surface corresponding to the sloping surface 86 of the metering pin 81, whereby the fluid flow from the cylinder 26 through the orifice between metering pin and piston 56 to the fluid chamber 24 will gradually, increasingly be restricted and consequently the return movement of spring 22 to its normal position will gradually, increasingly be resisted. Piston 56 is provided with a relief valve including parts corresponding to the parts 73, 75 and the like of the relief valve of piston 55 so that excessive pressures within the cylinder 26 may be compensated for. As the piston 56 moves downwardly, due to the deflexing movement of spring 22, piston 55 will move upwardly in its cylinder 25, thus permitting fluid from the fluid chamber 24 to push the valve 67 from its seat 66 against the effect of spring 68 and thus establishing a free flow of fluid from the fluid chamber 24 through passages 59, as well as the passage portion 71 above valve 73 which is in communication with passages 59 by passage 76.

If it is desired to increase or decrease the resistance of the pistons to the movement of spring 22, metering pins 81 having differently shaped recesses 85 may be inserted within the cylinders 25 and 26, or cap screw 99 may be removed and the metering pin 97 may be manually adjusted to vary the fluid flow capacity of the duct 96.

From the aforegoing it may be seen that applicant has provided a shock absorber of simple and compact construction, which may easily be assembled and which will resist both the approaching and separating movements of the frame and axle of the vehicle in an efficient manner.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a fluid chamber and a cylinder; a piston in the cylinder; means for reciprocating said piston; means in the piston for establishing a free flow of fluid from the fluid chamber into the cylinder space beneath the piston in response to the movement of the piston in one direction, means within the cylinder and cooperating with the piston for establishing a restricted flow of fluid from said cylinder space into the fluid chamber in response to the movement of the piston in the other direction; and means carried by the piston for establishing an additional flow of fluid from said cylinder space into the fluid chamber when the pressure upon the fluid in said cylinder space exceeds a predetermined value.

2. A shock absorber comprising in combination, a casing presenting a fluid chamber and a cylinder; a piston in said cylinder, said piston having a longitudinal groove in its outer surface and passages providing for the transfer of fluid from one side of the piston to the other; a metering pin in the cylinder, fitting into the piston groove, a spring-loaded valve normally closing one of said piston passages; a second spring-loaded valve normally closing the other piston passages; and means for reciprocating the piston in one direction whereby the second spring-loaded valve is opened to establish a free flow of fluid from the fluid chamber through the piston passages normally closed by said second spring-loaded valve and through a portion of the passage held closed by the first mentioned spring-loaded valve, said means when reciprocating the piston in the other direction causing a restricted flow of fluid from the cylinder past the metering pin and piston groove into the fluid chamber, and when the fluid pressure in the cylinder exceeds a predetermined value, lifting the first mentioned spring-loaded valve to establish an additional flow of fluid from the cylinder to the fluid chamber.

3. A shock absorber comprising in combination, a casing presenting a fluid chamber and two cylinders; a piston in each cylinder; means for reciprocating said pistons; means in each piston for establishing a free flow of fluid from the fluid chamber into the respective cylinders in response to the movement of the respective pistons in one direction; means for establishing a restricted flow of fluid from one cylinder to the other in response to the movement of one piston or the other in the other direction; means for establishing a restricted flow of fluid from either one cylinder or the other to the fluid chamber in response to the movement of one or the other piston in said other direction; and means in each piston for establishing an additional flow of fluid from either one or the other of the cylinders to the fluid chamber when the fluid pressure in said cylinder exceeds a predetermined value.

4. A shock absorber comprising in combination, a casing presenting a fluid chamber and two cylinders so arranged that their axes converge; a piston in each cylinder; means in the casing for reciprocating the pistons; valved passages in each piston for establishing a free flow of fluid from the fluid chamber into the spaces beneath the respective pistons in response to the movement of said pistons in one direction; means in each cylinder, cooperating with the respective pistons for establishing a restricted flow of fluid from the respective cylinders to the fluid chamber in response to the movement of the respective pistons in the other direction; a passage in each piston provided with a normally closed spring-loaded valve, for establishing an additional fluid flow from the respective cylinders to the fluid chamber in response to excessive pressures within said cylinders as the respective pistons move in said other direction; and a common relief port between the two cylinders adjacent their converging ends.

5. A shock absorber comprising in combination, a casing presenting a fluid chamber and two cylinders so arranged that their axes converge; a piston in each cylinder; means in the casing for reciprocating the pistons; valved passages in each piston for establishing a free flow of fluid from the fluid chamber into the spaces beneath the respective pistons in response to the movement of said pistons in one direction; means in each cylinder, cooperating with the respective pistons for establishing a restricted flow of fluid from the respective cylinders to the fluid chamber in response to the movement of the respective pistons in the other direction; a passage in each piston provided with a normally closed spring-loaded valve, for establishing an additional fluid flow from the respective cylinders to the fluid chamber in response to excessive pressures within said cylinders as the respective pistons move in said other direction; a duct in the casing providing communication between the cylinders adjacent their converging ends, said duct having a manually adjustable valve for controlling the fluid flow therethrough.

6. A shock absorber comprising in combination, a casing presenting a fluid chamber and two cylinders so arranged that their axes converge; a piston in each cylinder; means in the casing for reciprocating the pistons; valved passages in each piston for establishing a free flow of fluid from the fluid chamber into the spaces beneath the respective pistons in response to the movement of said pistons in one direction; means in each cylinder, cooperating with the respective pistons for establishing a restricted flow of fluid from the respective cylinders to the fluid chamber in response to the movement of the respective pistons in the other direction; a passage in each piston provided with a normally closed spring-loaded valve, for establishing an additional fluid flow from the respective cylinders to the fluid chamber in response to excessive pressures within said cylinders as the respective pistons move in said other direction; and a constantly open duct providing communication between the cylinders adjacent their converging ends.

7. A shock absorber comprising in combination, a casing presenting a fluid chamber and two cylinders so arranged that their axes converge; a piston in each cylinder; means in the casing for reciprocating the pistons; valved passages in each piston for establishing a free flow of fluid from the fluid chamber into the spaces beneath the respective pistons in response to the movement of said pistons in one direction; means in each cylinder, cooperating with the respective pistons for establishing a restricted flow of fluid from the respective cylinders to the fluid chamber in response to the movement of the respective pistons in the other direction; a passage in each piston provided with a normally closed spring-loaded valve, for establishing an additional fluid flow from the respective cylinders to the fluid chamber in response to excessive pressures within said cylinders as the respective pistons move in said other direction, and a constantly open, manually adjustable fluid flow controlling device providing communication between the cylinders adjacent their converging ends.

8. A shock absorber comprising in combination, a casing presenting a fluid chamber and two closed end cylinders; a cover for said casing; a piston in each cylinder, each piston having a longitudinal groove in its outer surface; a metering pin in each cylinder fitting into the longitudiul groove of its respective piston, one end of each pin resting upon the closed end of its respective cylinder; and means carried by the casing cover, yieldably gripping the other ends of the respective metering pins to maintain them in proper position.

9. A shock absorber comprising in combination, a casing presenting a fluid chamber and two closed end cylinders; a cover for said casing; a piston in each cylinder, each piston having a longitudinal groove in its outer surface; a metering pin in each cylinder fitting into the longitudinal groove of its respective piston, one end of each pin resting upon the closed end of its respective cylinder; recessed nuts carried by the casing cover in proper alignment with the respective metering pins; and springs interposed between the nuts and their respective metering pins yieldably to maintain said pins in proper position within their respective cylinders.

10. A shock absorber comprising, in combination, a casing presenting a fluid reservoir and a cylinder; a piston in said cylinder, said piston having passages providing for the transfer of fluid through the piston; a spring-loaded valve for each passage normally completely closing its respective passage, one acting oppositely from the other; and means within the cylinder and adapted to cooperate with the piston to establish a restricted flow around the piston.

11. A shock absorber comprising, in combination, a casing presenting a fluid reservoir and a cylinder; a piston in said cylinder, said piston having passages providing for the transfer of fluid through the piston; a spring-loaded valve for each passage normally completely closing said passage, one valve being adapted to open only when the piston is moving in one direction, the other being adapted to open only when the piston is moving in the opposite direction; and a means within the cylinder and cooperating with the piston as it moves in one direction only, to establish a variably restricted flow around the piston.

In testimony whereof I hereto affix my signature.

WILLIAM A. CHRYST.